(12) United States Patent
Pettus et al.

(10) Patent No.: US 8,385,461 B1
(45) Date of Patent: Feb. 26, 2013

(54) ON-OFF KEYING USING VECTOR MODULATION

(75) Inventors: Michael Gregory Pettus, Laguna Niguel, CA (US); Larry Bruce Nadeau, Laguna Niguel, CA (US)

(73) Assignee: Vubiq, Inc., Aliso Viejo, CA (US)

( * ) Notice: Subject to any disclaimer, the term of this patent is extended or adjusted under 35 U.S.C. 154(b) by 163 days.

(21) Appl. No.: 12/764,084

(22) Filed: Apr. 20, 2010

Related U.S. Application Data

(60) Provisional application No. 61/171,024, filed on Apr. 20, 2009.

(51) Int. Cl.
*H04L 27/00* (2006.01)
(52) U.S. Cl. ......... 375/295; 375/259; 375/261; 375/298
(58) Field of Classification Search .......... 375/259, 375/295, 261, 268, 298, 283, 300, 318, 244, 375/237–239; 332/103, 149, 109, 112, 115; 370/212–213
See application file for complete search history.

(56) References Cited

U.S. PATENT DOCUMENTS

| | | | |
|---|---|---|---|
| 2,542,700 A * | 2/1951 | Peterson | 370/205 |
| 3,623,105 A * | 11/1971 | Kamen et al. | 455/102 |
| 4,684,952 A | 8/1987 | Munson et al. | |
| 4,752,680 A | 6/1988 | Larsson | |
| 5,103,210 A | 4/1992 | Rode et al. | |
| 5,276,345 A | 1/1994 | Siegel et al. | |
| 5,347,287 A | 9/1994 | Speciale | |
| 5,479,400 A | 12/1995 | Dilworth et al. | |
| 5,751,176 A * | 5/1998 | Sohn et al. | 327/295 |
| 5,784,543 A | 7/1998 | Marchand | |
| 5,864,061 A | 1/1999 | Dilz, Jr. | |
| 5,903,239 A | 5/1999 | Takahashi et al. | |
| 5,960,029 A | 9/1999 | Kim et al. | |
| 6,037,894 A | 3/2000 | Pfizenmaier et al. | |
| 6,236,761 B1 | 5/2001 | Marchand | |
| 6,424,315 B1 | 7/2002 | Glenn et al. | |
| 6,476,756 B2 | 11/2002 | Landt | |
| 6,509,836 B1 | 1/2003 | Ingram | |
| 6,542,083 B1 | 4/2003 | Richley et al. | |
| 6,545,646 B2 | 4/2003 | Marchand | |

(Continued)

FOREIGN PATENT DOCUMENTS

| | | |
|---|---|---|
| EP | 0766410 A2 | 4/1997 |
| EP | 0884799 A2 | 12/1998 |

(Continued)

OTHER PUBLICATIONS

Clos, C., "A Study of Non-Blocking Switching Networks," The Bell System Technical Journal, 1953.

(Continued)

*Primary Examiner* — Jean B Corrielus
(74) *Attorney, Agent, or Firm* — LeClairRyan, a Professional Corporation

(57) ABSTRACT

A system and method including deriving a subcarrier frequency from a binary data stream having a clock frequency, wherein the subcarrier frequency is substantially the same as the clock frequency; gating the subcarrier frequency using the data stream to produce a modulated OOK signal; determining a OOK subcarrier center frequency based on the modulated OOK signal with the clock frequency; delaying the modulated OOK signal relative to the binary data stream by a predetermined amount to produce a delayed modulated OOK signal; conditioning the modulated OOK signal and the delayed modulated OOK signal to create a differential transition signal in an I channel and a Q channel to provide a stable amplitude signal level reference at an input to an I and Q vector modulator.

10 Claims, 10 Drawing Sheets

U.S. PATENT DOCUMENTS

| | | | |
|---|---|---|---|
| 6,547,140 | B2 | 4/2003 | Marchand |
| 6,600,428 | B1 | 7/2003 | O'Toole et al. |
| 6,696,879 | B1 | 2/2004 | O'Toole et al. |
| 6,721,289 | B1 | 4/2004 | O'Toole et al. |
| 6,735,183 | B2 | 5/2004 | O'Toole et al. |
| 6,836,472 | B2 | 12/2004 | O'Toole et al. |
| 6,891,391 | B2 | 5/2005 | Hiroki |
| 6,972,714 | B1 | 12/2005 | Baharav et al. |
| 7,005,891 | B2 * | 2/2006 | Lee ............................. 326/86 |
| 7,103,279 | B1 * | 9/2006 | Koh et al. .................... 398/115 |
| RE40,385 | E | 6/2008 | Bang et al. |
| 7,443,906 | B1 | 10/2008 | Bang et al. |
| 7,538,593 | B2 * | 5/2009 | Agarwal et al. .............. 327/257 |
| 7,570,099 | B2 * | 8/2009 | Lin et al. ....................... 327/356 |
| 8,010,859 | B2 * | 8/2011 | Lee ............................... 714/748 |
| 2007/0030921 | A1 * | 2/2007 | Friedrich .................... 375/300 |

FOREIGN PATENT DOCUMENTS

| | | |
|---|---|---|
| EP | 1357395 A1 | 10/2003 |
| WO | 0065691 | 11/2000 |
| WO | 2004004083 A1 | 1/2004 |
| WO | 2006007002 A1 | 1/2006 |

OTHER PUBLICATIONS

Schrank, H., "Analysis of the Radiation Resistance and Gain of a Full-Wave Dipole," IEEE Antennas and Propagation Magazine, vol. 36, No. 5, Oct. 1994.

Aoki, S. et al., "A Flip Chip Bonding Technology Using Gold Pillars for Millimeter-Wave Applications," IEEE MIT-S Digest, 1997.

Gilleo, K., "Chip Scale or Flip Scale—the Wrong Question?", Cookson Electronics, 1998.

Agarwal, B et al. "A Transferred-Substrate HBT Wide-Band Differential Amplifier to 50 GHz," IEEE Microwave and Guided Wave Letters, vol. 8, No. 7, Jul. 1998.

Deal, W. et al., "Integrated-Antenna Push-Pull Power Amplifiers," IEEE Transactions on Microwave Theory and Techniques, vol. 47, No. 8, Aug. 1999.

Jentzsch, A., "Theory and Measurements of Flip-Chip Interconnects for Frequencies up to 100 GHz," IEEE Transactions on Microwave Theory and Techniques, vol. 49, No. 5, May 2001.

Hang, C. et al., "High-Efficiency Push-Pull Power Amplifier Integrated with Quasi-Yagi Antenna," IEEE Transactions on Microwave Theory and Techniques, vol. 49, No. 6, Jun. 2001.

Abele, P. et al, "Wafer Level Integration of a 24 GHz Differential SiGe-MMIC Oscillator with a Patch Antenna using BCB as a Dielectric Layer," Dept. of Electron Devices and Circuits, University of Ulm, 2003.

Brauner, T., "A Differential Active Patch Antenna Element for Array Applications," IEEE Microwave and Wireless Components Letters, vol. 13, No. 4, Apr. 2003.

Karnfelt, C. et al, "Flip Chip Assembly of a 40-60 GHz GaAs Microstrip Amplifier," 12th GAAS® Symposium—Amsterdam, 2004.

Boustedt, K, "GHz Flip Chip—An Overview," Ericsson Microwave Systems AB, Core Unit Research Center Microwave and High Speed Electronics, 2004.

Pfeiffer, U., "Low-loss Contact Pad with Thned Impedance for Operation at Millimeter Wave Frequencies," IEEE SPI 2005, Published 2005.

"Pfeiffer, U., et al., ""Equivalent Circuit Model Extraction of Flip-Chip BallInterconnects Based on Direct Probing Techniques,"" IEEE Microwave and Wireless Components Letters, vol. IS, No. 9, Sep. 2005".

Viallon, C., "Microwave Differential Structures Optimization: Application to a Double Balanced SiGe Active Down-Converter Design," RFIT2005—IEEE International Workshop on Radio-Frequency Integration Technology, Nov. 2005.

Pfeiffer, U., et al., "A 60GHz Radio Chipset Fully-Integrated in a Low-Cost Packaging Technology," 2006 Electronic Components and Technology Conference, 2006.

Pfeiffer, U., et al., "A Chip-Scale Packaging Technology for 60-GHz Wireless Chip Sets," IEEE Transactions on Microwave Theory and Techniques, vol. 54, No. 8, Aug. 2006.

* cited by examiner

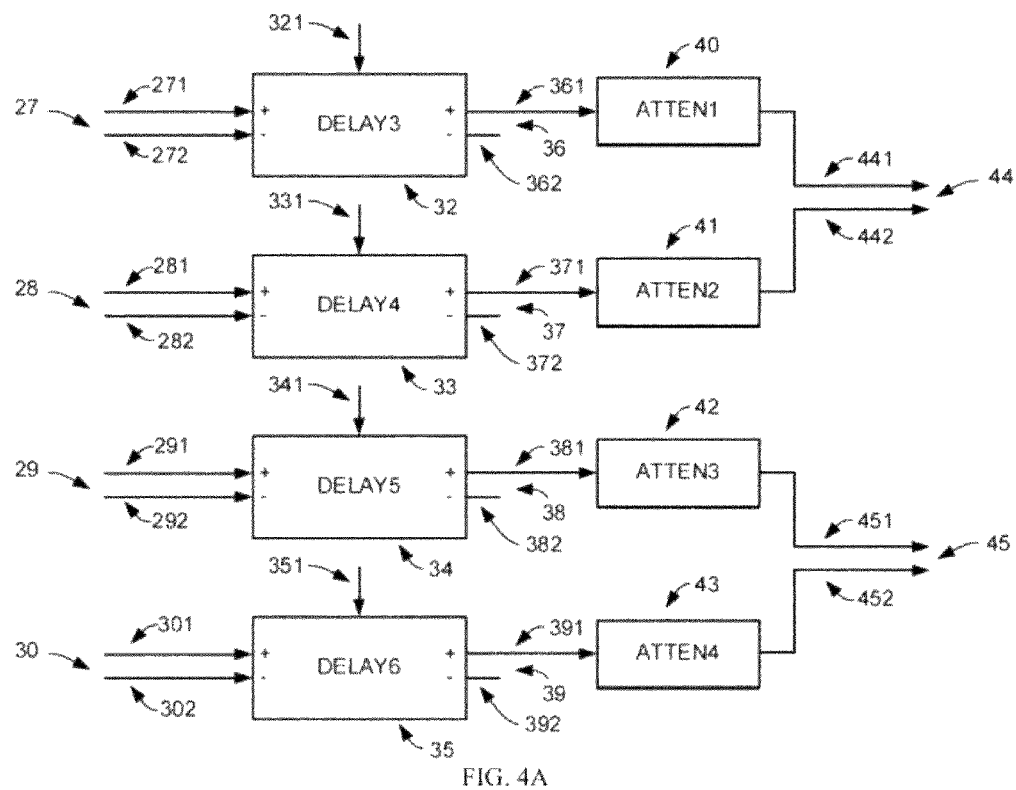
FIG. 4A
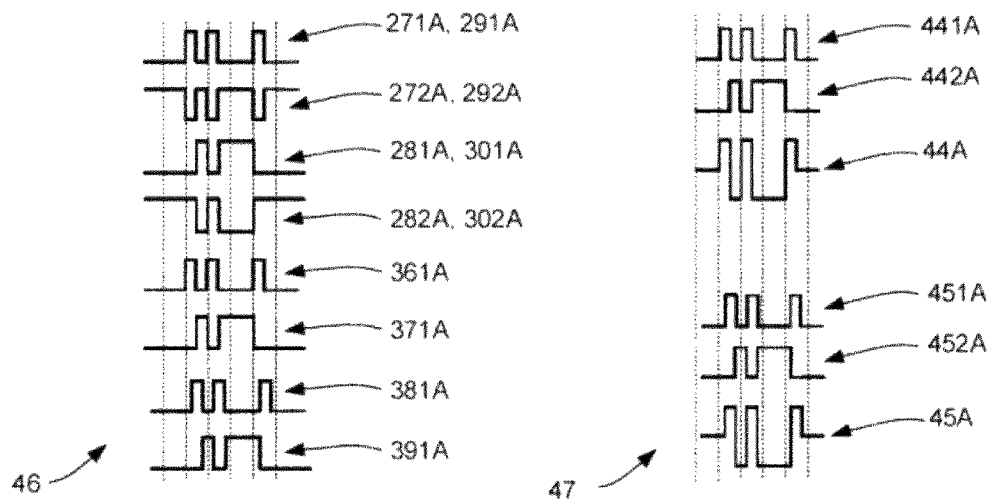
FIG. 4B
FIG. 4C

ON-OFF KEYING USING VECTOR MODULATION

STATEMENT OF RELATED APPLICATION

The present application claims the benefit of priority based on U.S. Provisional Patent Application Ser. No. 61/171,024, filed on Apr. 20, 2009, in the name of inventors Michael Gregory Pettus and Larry Bruce Nadeau, entitled "On-Off Keying Using Vector Modulation", all commonly owned herewith, and hereby incorporated by reference in its entirety.

TECHNICAL FIELD

The present disclosure relates generally to high speed modulation techniques used in conjunction with broadband wireless communications systems.

BACKGROUND

As microelectronics and integrated silicon technologies continue to improve in performance, fully integrated wireless transmitters, receivers and transceivers are now being realized in single chip architectures up through the millimeter wave frequencies (30 to 300 GHz). Vector modulation, comprised of two modulating signals with a quadrature phase relationship between them, is used extensively in advanced single chip transmitter and transceiver designs. The modulating signals are typically AC-coupled to avoid DC bias offsets for the vector modulation inputs. The vector modulation inputs are typically connected to the in-phase (I) and quadrature-phase (Q) fully balanced radio frequency multipliers (mixers). The balanced I and Q mixers suppress the main carrier frequency energy when there are no modulation signals present. Millimeter wave spectrum is by nature allocated in large frequency bands which in turn allows the use of very wide bandwidth transmission using simple modulation techniques such as AM or OOK (on-off keying). The use of such simple wideband modulation techniques is desired in order to enable straightforward system level design incorporating receivers that use non coherent demodulation techniques such as square law or envelope detection. What is needed is a simple baseband method that can generate OOK modulation within the constraints of AC-coupled vector modulated transmitter circuit architectures.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIGS. 4A-4C illustrates an electronic block diagram and signal timing diagrams for the delay circuits and attenuator circuits portion of the system in an aspect of the present disclosure;

OVERVIEW

Figure 1A:
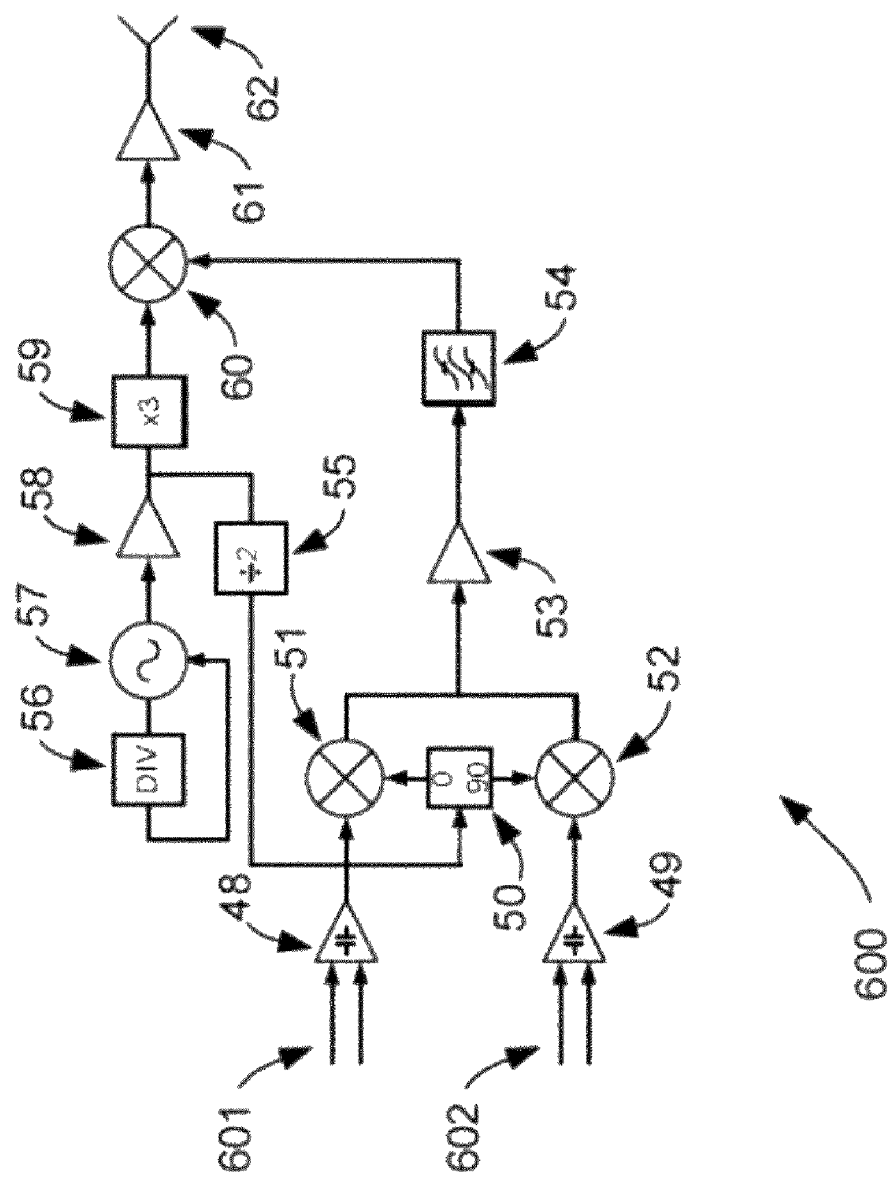
FIGS. 1A-1C illustrates an electronic block diagram, signal timing and spectrograph transmission information for a vector modulated transmitter with existing serial data signals applied in accordance with the prior art.

In an aspect, a serial data stream composed of a single high-speed digital electrical signal is separated into its constituent clock signal (timing reference) and data signal. The data signal and clock signal are preferably time adjusted (phase skewed) such that the phase relationship between them is optimized for gating of the clock signal by the data signal. The data signal and clock signal are each coupled to a 2-input digital logic circuit which gates a single output signal as a digital AND function thereby creating a baseband signal composed of an on-off keyed (OOK) data modulated clock signal.

Two sets of the OOK baseband signals are created with a 90 degree phase lag between them with one set coupled to the in-phase (I) input of a vector modulated transmitter and the other (phase lagged) set coupled to the quadrature-phase (Q) input. The I and Q signals are time adjusted (phase skewed) such that the phase relationship between them is optimized for creating the in-phase and quadrature-phase timing with respect to a vector modulated input transmitter.

The resulting I and Q phase modulated transmitter signal are typically coupled to a vector modulated transmitter thereby creating a single sideband OOK modulated signal at the output of the transmitter. In order to efficiently couple the OOK signal to an AC-coupled vector modulated transmitter the OOK signal is converted from differential digital logic levels to a modified form of non-return-to-zero (NRZ) such that during the OOK modulation on-period when the data signal is enabling the clock signal, a modified NRZ signal is created, designated as transition differential signaling (TDS).

The TDS signal is composed of an NRZ line coded clock signal during data high or data logical 1 periods and is returned to zero during data low or data logic 0 periods. TDS signaling minimizes low-frequency time constant shifts which thereby accommodates an AC-coupled vector modulated transmitter by providing a zero-energy signal reference during OOK off periods.

The method of the present disclosure comprises deriving a subcarrier frequency from a binary data stream having a clock frequency, wherein the subcarrier frequency is substantially the same as the clock frequency. The subcarrier frequency is gated using the data stream to produce a modulated on-off keying signal. The modulated on-off keying signal is delayed relative to the binary data stream by a predetermined amount to produce a delayed modulated on-off keying signal. The modulated on-off keying signal and the delayed modulated on-off keying signal are conditioned to create a differential transition signal in an in-phase channel and a quadrature-phase channel to provide a stable amplitude signal level reference at an input to an in-phase and quadrature-phase vector modulator.

DESCRIPTION OF EXAMPLE EMBODIMENTS

Example embodiments are described herein in the context of high speed digital wireless communications systems.

Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, signal timing and/or data structures described herein may be implemented using various types of digital logic operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Existing integrated wireless transmitter devices are designed to handle high bit rate signals coupled to the in-phase (I) and quadrature-phase (Q) signal inputs of the baseband up-converting radio frequency (RF) mixers. The baseband-to-RF mixers provide a method for generating a modulated RF signal but with a suppressed RF carrier. The mixers are fully balanced such that there is very low or suppressed carrier energy during periods of no modulating signal inputs at the inputs to the mixers. The purpose of the suppressed carrier mixers is to create higher order digital modulation schemes such as binary phase shift keying (BPSK), quadrature phase shift keying (QPSK), and generally any higher order phase or amplitude/phase modulation techniques (M-Ary digital modulation).

To use the higher order modulation schemes, however, a complex receiver design is needed for both carrier recovery and symbol timing recovery. The system implementation is also affected by practical design limitations in terms of phase noise and bandwidth flatness of the transmitter and receiver.

At the higher frequency RF bands, such as those in the millimeter wave bands (considered to be generally above 30 GHz), there is more bandwidth available as a natural aspect of the higher operating frequency. For example, there are bands generally available for high bandwidth applications at 60, 70, 80 and 90 GHz with both unlicensed and licensed regulatory allocations. Specifically in the United States, the band from 57 to 64 GHz, a total of 7 GHz bandwidth, is available for unlicensed operation. With such large bandwidths available, the requirement for achieving higher order modulation efficiencies is not needed.

Much simpler and less expensive system designs can be achieved by using lower order modulations schemes such as AM or OOK and FM or FSK. By using OOK or FSK for digital modulation applications, the receiver need not provide carrier recovery and need not be phase coherent; both of which significantly reduce the system complexity and cost. Since non-coherent modulation does not depend upon referencing the phase of the received signal, system level phase noise created in both the transmitter and receiver do not impact the performance of the receiver's non-coherent detection mechanism. Typical non-coherent OOK receiver detection makes use of envelope, square-law and product detectors which are simple and low-cost compared with phase coherent demodulation schemes.

Figure 1B:
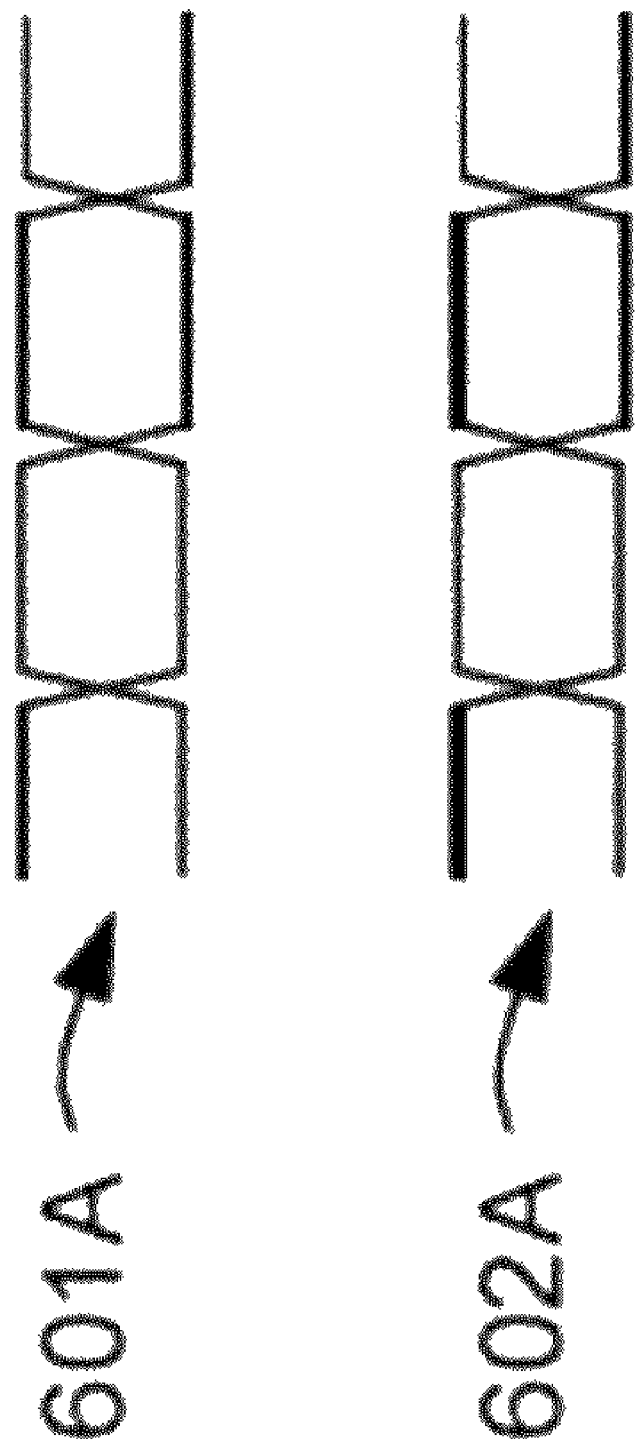

FIG. 1A illustrates a block diagram of a typical vector modulated transmitter 600 intended for operation within the 60 GHz millimeter wave spectrum in accordance with the prior art. Serial data signal, represented by 601A and 602A in FIG. 1B, is coupled to in-phase (I) channel and quadrature-phase (Q) channel inputs at 601 and 602. The I channel input 601 and Q channel input 602 are received at differential, AC-coupled input stage components 48, 49.

The input stage components 48, 49 output the received I and Q channel inputs into mixers 51 and 52, respectively. Up-converting balanced I mixer 51 and balanced Q mixer 52 produces a suppressed carrier double sideband (SCDSB) signal at the output of the mixers 51 and 52 at the intermediate frequency (IF). The IF amplifier 53 increases the signal level of the SCDSB signal, which is then passed through an IF filter 54. The output of the IF filter 54 is transmitted to a final mixer 60 which provides a second stage up-conversion of the signal to 60 GHz which is then sent to a power amplifier 61 and ultimately output via a transmitting antenna 62.

The transmitter 600 includes a millimeter wave frequency synthesizer 604 which comprises a voltage controlled oscillator 57 (VCO), a divisor circuit 56, an IF divider 55 and a frequency tripler 59. The synthesizer 604 provides both an IF up-converting mixer source and local oscillator (LO) injection for the transmitter. The phase shift circuit 50 provides IF in-phase (I) and quadrature-phase (Q) mixer injection for mixer 51 at 0 degrees phase reference and mixer 52 at 90 degrees phase reference respectively.

Figure 1C:
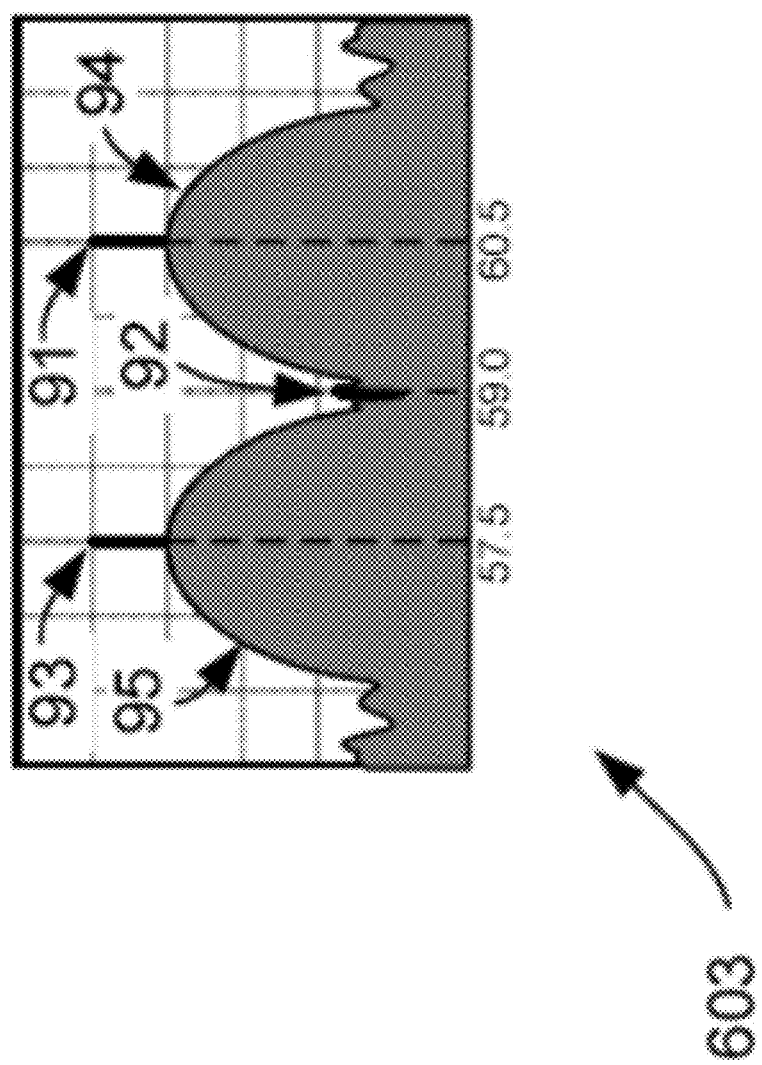

The output spectrum of the transmitter 600 is indicated by spectrograph 603 in FIG. 1C. In the example the digital serial data is clocked at 1.5 GHz. In the spectrograph 603 in FIG. 1C, the synthesizer 604 of the system 600 is set to 59.0 GHz. Output spectrum is composed of a suppressed carrier double sideband signal created by the digital signal 601A and 602A. The upper sideband modulation signal is shown as 91 in the spectrograph 603 whereas the lower sideband modulation signal 93 is symmetrically positioned 1.5 GHz above and 1.5 GHz below the suppressed carrier 92. As shown in the spectrograph 603, the lower sideband modulation energy is shown by arrow 95 whereas the upper sideband modulation energy is shown by arrow 94.

With only a vector modulation (I and Q) input, the transmitter does not provide a method to create full carrier OOK modulation. Additionally, considering that the transmitter 600 in FIG. 1A provides only a suppressed carrier 92, the intended receiver (not shown) of the system would have to create a local carrier reference that is in phase with the transmitter carrier to properly demodulate serial data signal sent from the transmitter. This creates a disadvantage, as the desire is to use a simple, non-coherent receiver design.

Figure 2A:
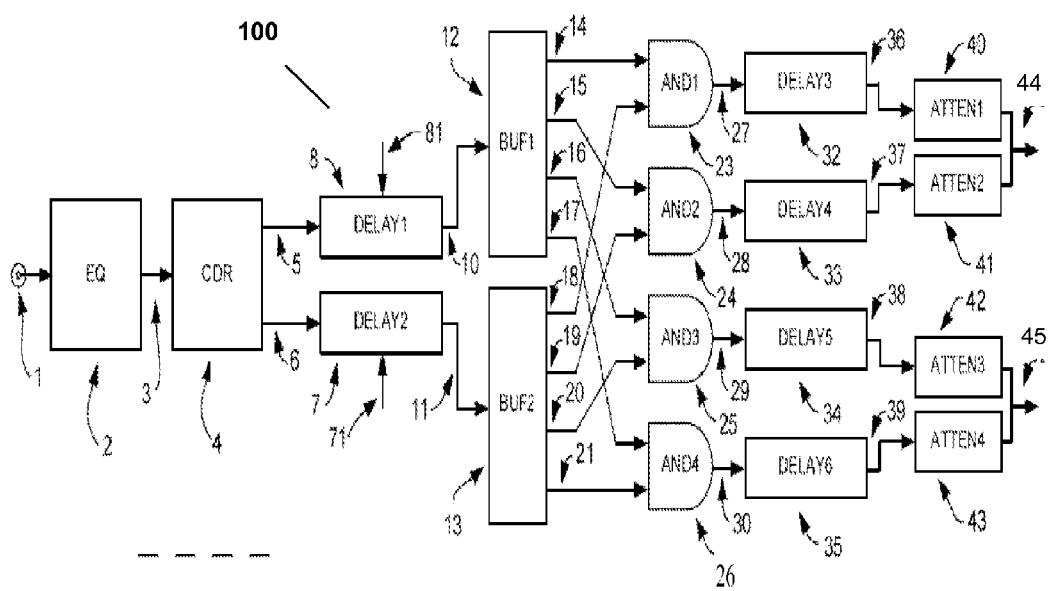
FIGS. 2A-2B illustrate an overall electronic circuit block diagram and signal timing for OOK baseband signal generation of an aspect of the present disclosure.

FIG. 2A illustrates an overall circuit block diagram of an OOK baseband signal modulation system 100 in accordance with an aspect of the present disclosure. As shown in FIG. 2A, the OOK baseband signal modulation system 100 includes an equalization circuit 2, such as one manufactured by Gennum™ GS2974B, and a clock data recovery circuit 4 (CDR), such as one manufactured by Gennum™ GS2975, which is configured to receive the output of the equalization circuit 2.

The OOK baseband signal modulation system 100 preferably includes one or more first set of delay circuits 7, 8 coupled to the clock data recovery circuit 4. The delay circuits 7, 8, although shown as two separate components in FIG. 2A, may be housed in one physical component, such as Micrel™ SY89297U, although other manufacturers are contemplated.

The system 100 preferably includes one or more buffer fan-out circuits 12, 13 coupled to the delay circuit(s) 7, 8. The buffer fan-out circuits 12, 13 may be a Micrel™ SY100EP14U, although other fan-out circuits are contemplated. In addition, the system 1 includes one or more AND gates 23, 24, 25 and 26 configured to receive the outputs from the buffer fan-out circuits 12, 13. It is preferred that a quad AND gate configuration is utilized, such as On Semiconductor™ MC100EP105, although other manufacturers and parts are contemplated.

The system 100 includes one or more second set of delay circuits 32, 33, 34, and 35 configured to receive the outputs from the AND gates 23, 24, 25 and 26. The system 100 also includes one or more attenuators 40, 41, 42 and 43 which are configured to receive the outputs from the second set of delay circuits 32, 33, 34, and 35. It should be noted that the system 100 shown in FIG. 2A is one example and additional/alternative circuits and/or components may be utilized to practice the novel method and system described herein. It should also be noted that, for instance, more than one circuit may be embodied into one chip or processor without departing from the spirit and scope of the novel method and system.

Figure 2B:
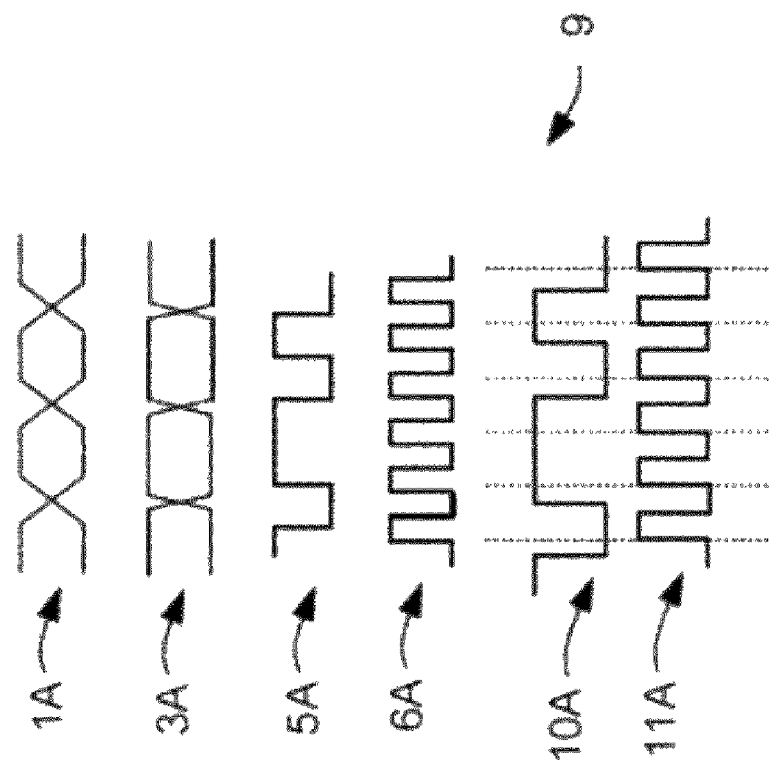

FIG. 2B illustrates the characterization of the signal in a signal timing diagram 9 as it is conditioned through the system 100 in FIG. 2A. In particular, serial, binary digital data 1 (FIG. 2A) in the signal timing diagram 1A (FIG. 2B) illustrates the signal prior to being received by the EQ circuit in FIG. 2A.

Referring back to FIG. 2A, the EQ circuit 2 compensates for possible signal degradation of signal 1A and outputs equalization signal 3 to the CDR circuit 4. The characterization of the equalization signal 3A in a signal timing diagram is shown in FIG. 2B.

The clock data recovery circuit (CDR) 4 receives the equalization signal 3 and outputs a data output signal 5 and a clock output signal 6 representative of the equalization signal 3, as shown in FIG. 2A. The CDR circuit 4 derives a subcarrier frequency for the clock signal from the binary data stream 1, such that the subcarrier frequency is actually the clock frequency of the data stream. The characterization of the data output signal 5 and the clock output signal 6 are respectively shown in the signal timing diagram in FIG. 2B as the data output signal 5A and clock output signal As shown in FIG. 2A, the data output signal 5 is received in a delay circuit 8 in a first set of delay circuits, whereas the clock signal 6 is received in a delay circuit 7 in the first set of delay circuits. The delay circuits 7, 8 are controlled at control interfaces 71, 81 by one or more processors and/or microcontrollers (not shown) to allow the delay circuits 7,8 to adjust the phase (skew) of the clock signal and data output signal. In particular, either or both of the delay circuits are adjusted via the control interfaces 71, 81 by a microcontroller to align data output signal and clock signal such that an entire clock cycle will fit within an ON or OFF period of the data output signal. An example of a desired alignment between the data output signal 10A and the clock signal 11A is shown in FIG. 2B.

The delay circuit 8, upon receiving the data output signal 5, may adjust the phase of the data output signal 5 a predetermined amount, as explained above, and output a skew-adjusted data signal 10. The delay circuit 7, upon receiving the clock signal 6, may adjust the phase of the clock signal 6 a predetermined amount, as explained above, and output a skew-adjusted clock signal 11. The characterization of the skew-adjusted data signal 10A and the skew-adjusted clock output signal 11A are respectively shown in the signal timing diagram in FIG. 2B. It is contemplated that either, both, or neither of the phases of the clock signal and/or data output signal be skew-adjusted.

Upon the data output signal 10 and the clock signal 11 being output by the delay circuits 7, 8, the subcarrier or clock signals are then gated directly by the data stream. This results in a modulated OOK signal having a clock frequency that determines the OOK subcarrier center frequency.

In particular, the data signal 10 output from the delay circuit 8 is received at a first buffer fan-out circuit 12, whereas the clock signal 11 output from the delay circuit 7 is received at a second buffer fan-out circuit 13. The first buffer fan-out circuit 12 takes the received data signal 10 and outputs four identical data signals 14-17 to the respective AND gates 23-26. Additionally, the second buffer fan-out circuit 13 takes the received clock signal 11 and outputs four identical clock signal outputs 18-21 to the respective AND gates 23-26.

Figure 3A:
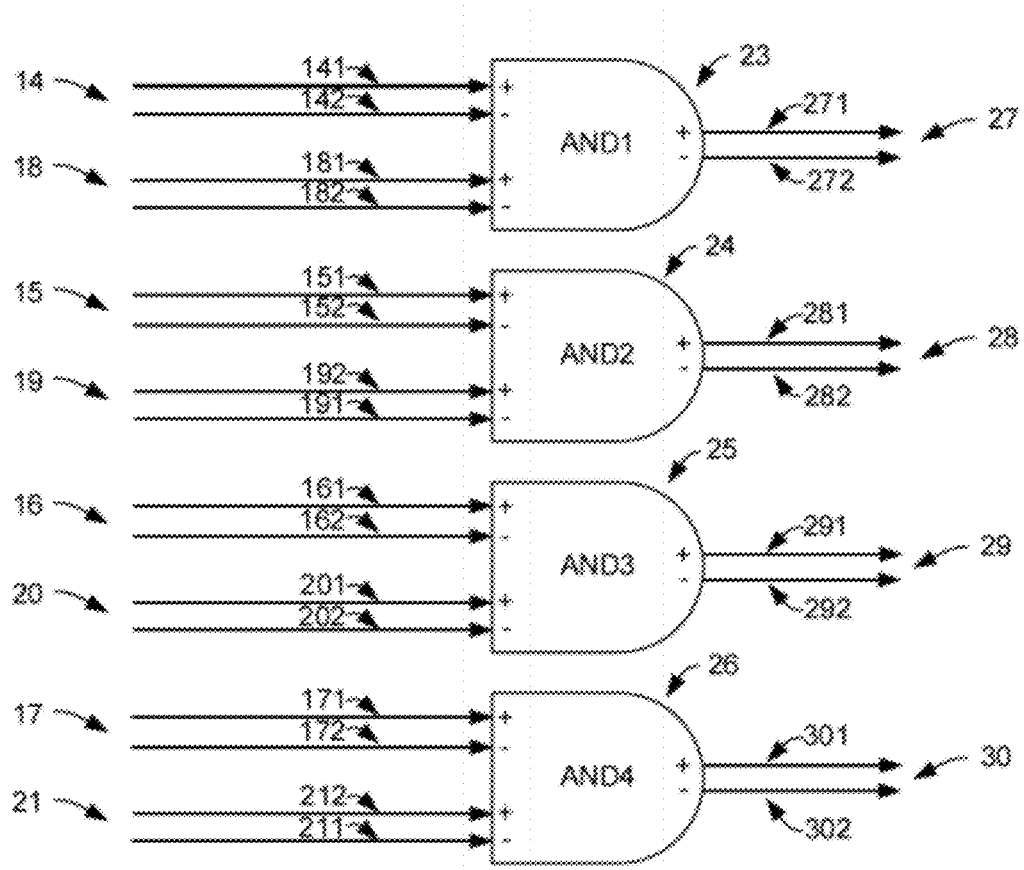
FIGS. 3A-3B illustrate an electronic circuit block diagram and signal timing for the AND gate portion of an aspect of the present disclosure.

FIG. 3A illustrates a detailed view of the input signals and output signal with respect to the AND gates 23-26 shown in FIG. 2A in accordance with an aspect of the present disclosure. As shown in FIG. 3A, each AND gate 23-26 receives a differential pair of data signals as well as a differential pair of clock signals.

In particular, the data signal 14 is represented as differential data signals 141 and 142, whereby the polarity of the data signal 141 is inverted to produce an inverted data signal 142. Additionally, the data signal 15 is represented as differential signals 151 and 152, whereby the polarity of the data signal 151 is inverted to produce an inverted data signal 152. The same applies to differential signals 161, 162, 171, 172 for respective data signals 16 and 17. The above mentioned data signals are shown characterized in the signal diagram in FIG. 3B.

Figure 3B:
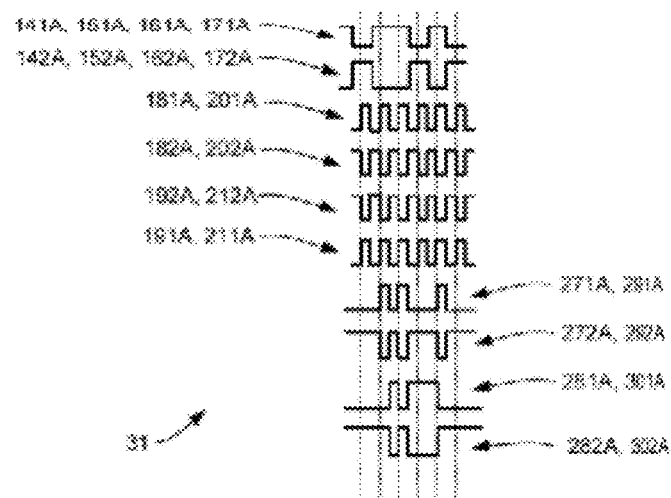

With regard to the clock signals 18-21 received by the AND gates 23-26, the clock signals 18-21 are selectively inverted in polarity and selectively input in to the AND gates 23-26 in opposing differential pairs. In particular to that shown in FIGS. 3A and 3B, the clock signal 18 is provided as differential clock signals 181 and 182 into AND gate 23, whereby a clock signal 181 is received in the positive "+" terminal and a clock signal 182 is received in the negative "−" terminal of the AND gate 23. As shown in FIG. 3B, the differential clock signal 182 has an inverted polarity with respect to the differential clock signal 181.

As shown in FIGS. 3A and 3B, the s clock signal 19 is provided as differential clock signals 191 and 192 into AND gate 24. As opposed to differential clock signals 181 and 182 discussed above, the differential clock signal 191 is received in the negative "−" terminal and differential clock signal 192 is received in the positive "+" terminal of the AND gate 24. As shown in FIG. 3B, the differential clock signal 192 has an inverted polarity with respect to the differential clock signal 191, whereby differential clock signal 192 is similar in polarity to differential clock signal 182 and differential clock signal 191 is similar in polarity to differential clock signal 181.

Additionally in FIGS. 3A and 3B, the clock signal 20 is provided as differential clock signals 201 and 202 into AND gate 25, whereby differential clock signal 201 is received in the positive "+" terminal and differential clock signal 202 is received in the negative "−" terminal of the AND gate 25 As shown in FIG. 3B, the differential clock signal 202 has an inverted polarity with respect to the differential clock signal 201, whereby differential clock signal 201 is similar in polarity to differential clock signal 181 and differential clock signal 202 is similar in polarity to differential clock signal 182.

As shown in FIGS. 3A and 3B, the clock signal 21 is provided as differential clock signals 211 and 212 into AND gate 26. As opposed to differential clock signals 201 and 202 discussed above, the differential clock signal 211 is received in the negative "−" terminal and differential clock signal 212 is received in the positive "+" terminal of the AND gate 26. As shown in FIG. 3B, the differential clock signal 212 has an inverted polarity with respect to the differential clock signal 211, whereby differential clock signal 212 is similar in polarity to differential clock signal 192 and differential clock signal 211 is similar in polarity to differential clock signal 191.

The AND gates 23-26 perform AND operations on the input signals to create a modulated OOK signal with respect to the clock frequency. By performing this step, the system is able to determine an OOK subcarrier center frequency. By performing the AND operation on each of the differential signals, only the positive signals are used. Since the opposite differential polarity is present between each pair of delay elements, making use of the same polarity (+) from the separate delay elements within a pair, a new differential pair of signals is formed but with a common resting state voltage. Only during signaling transitions are the differential signals within an output pair at opposite voltage polarity.

In particular, the AND gate 23 outputs a baseband OOK clock signal in the I-channel 27 which has differential components 271 and 272. As can be seen in FIG. 3B, the positive "+" differential component of the baseband OOK clock signal is shown as signal 271, whereas the negative "−" differential component of the baseband OOK clock signal, having an opposite polarity of differential component 271, is shown as signal 272. With respect to the AND gate 24, a baseband OOK clock signal 28 is output which has differential components 281 and 282. As can be seen in FIG. 3B, the positive "+" differential component of the baseband OOK clock signal is shown as signal 281, whereas the negative "−" differential component of the baseband OOK clock signal, having an opposite polarity of differential component 281, is shown as signal 282. Similarly, AND gate 25 outputs a baseband OOK clock signal 29 which has differential components 291 and 292 equal to differential components 271 and 272. Similarly, AND gate 26 outputs a baseband OOK clock signal 30 which has differential components 301 and 302 respectively equal to differential components 281 and 282.

As will be shown in FIG. 4A, the outputs from the AND gates 23, 24 generate OOK baseband signals 271, 272 and 281, 282 for the in-phase (I) transmitter modulator input into the second set of delay circuits 32, 33, whereas the AND gates 25, 26 generate the OOK baseband signals 291A, 292A and 301A, 302A for the quadrature-phase (Q) transmitter modulator input into the second set of delay circuits 34, 35.

FIG. 4A illustrates a detail view between the second set of delay circuits and the attenuator circuits of the circuit block diagram in FIG. 2A. As shown in FIG. 4A, the AND gate outputs 27, 28, 29, 30 are received by the delay circuits 32-35 in the second set of delay circuits via respective differential signal pairs 271, 272; 281, 282; 291, 292; and 301, 302. Delay skew adjustment between delay circuits 32, 33 compensate for physical and electrical length differences between respective differential signal pairs 271, 272 and 281, 282, whereas delay skew adjustment between delay circuits 34, 35 compensate for physical and electrical length differences between differential signal pairs 291A, 292A and 301A, 302A at differential inputs 291, 292 and 301, 302 respectively. Delay circuits 32, 33, 34, 35 are set via respective control interfaces 321, 331, 341, 351 by one or more processors (not shown).

Output signal phase 361 output from the delay circuit 32 and at output signal phase 371 output from the delay circuit 33 are set to be phase matched via the control interfaces 321, 331. Similarly, output signal phase of 381output from the delay circuit 34 and output signal phase 391 output from the delay circuit 35 are set to be phase matched. However, once differential delay compensation has been set, the delay circuits 34, 35 are both adjusted, preferably in tandem, to provide a delay of the clock cycle period for the Q-channel by 90 degrees of relative to the I-channel delay circuits 32, 33. Thus as shown in FIG. 4B, the output signals 381, 391 are delayed by 90 degrees relative to signals 361, 371.

As shown in FIG. 4A, the system conditions the outputs from the delay circuits 32 and 33 to form transition differential signaling (TDS) for the I-channel. In particular, only the positive polarity outputs from the delay circuits 32, 33 (i.e. outputs 361, 371) are received by the attenuators 40 and 41. In particular, the positive polarity output 361 from the delay circuit 32 is received by the attenuator 40, whereas the negative polarity output 362 is not used by the attenuator 40. Additionally, the positive polarity output 371 from the delay circuit 33 is received by the attenuator 41, whereas the negative polarity output 372 is not used by the attenuator 41.

To accommodate a range of transmitter I/Q input signal level requirements, the attenuators provide the correct signal level setting based on the specifications of the transmitter 600 and the receiver 700. The attenuators 40 and 41 combine the positive polarity output 361 (signal 441A in FIG. 4C) and the positive polarity output 271 (signal 442A in FIG. 4C) to create a TDS differential pair 44A for the I-channel.

Likewise, a TDS differential pair for the Q-channel is formed by combining only the positive polarity outputs from delay circuits 34, 35 at respective outputs 381, 391. In particular, the positive polarity output 381 from the delay circuit 34 is received by the attenuator 42, whereas the negative polarity output 382 is not used by the attenuator 42. Additionally, the positive polarity output 391 from the delay circuit 35 is received by the attenuator 43, whereas the negative polarity output 392 is not used by the attenuator 43. The new TDS differential signaling pair is formed by combining outputs 451, 452 at attenuators 42, 43, thereby forming the TDS differential pair 45 for the Q-channel. As stated above, the TDS differential pair 45 for the Q-channel is delayed by 90 degrees (via the delay circuits 34, 34) with respect to the differential pair of the I-channel.

As shown in FIG. 4C, the TDS signal for the I-channel 44A is combination of differential signals 441A and 442A, whereas the TDS signal 45A for the Q-channel is the combination of differential signals 451A and 452A. The TDS signaling is similar to non-return-to-zero (NRZ) line coding during the on-period of the OOK modulated clock signal. However, the TDS signaling returns to zero (RZ) during the off-period of the OOK modulated clock signal. By returning to zero during off-periods of the OOK clock modulated signal, the low-frequency time constant signaling distortion is avoided in the AC-coupled transmitter I/Q input stages 48 and 49 (FIG. 5A).

Figure 5A:
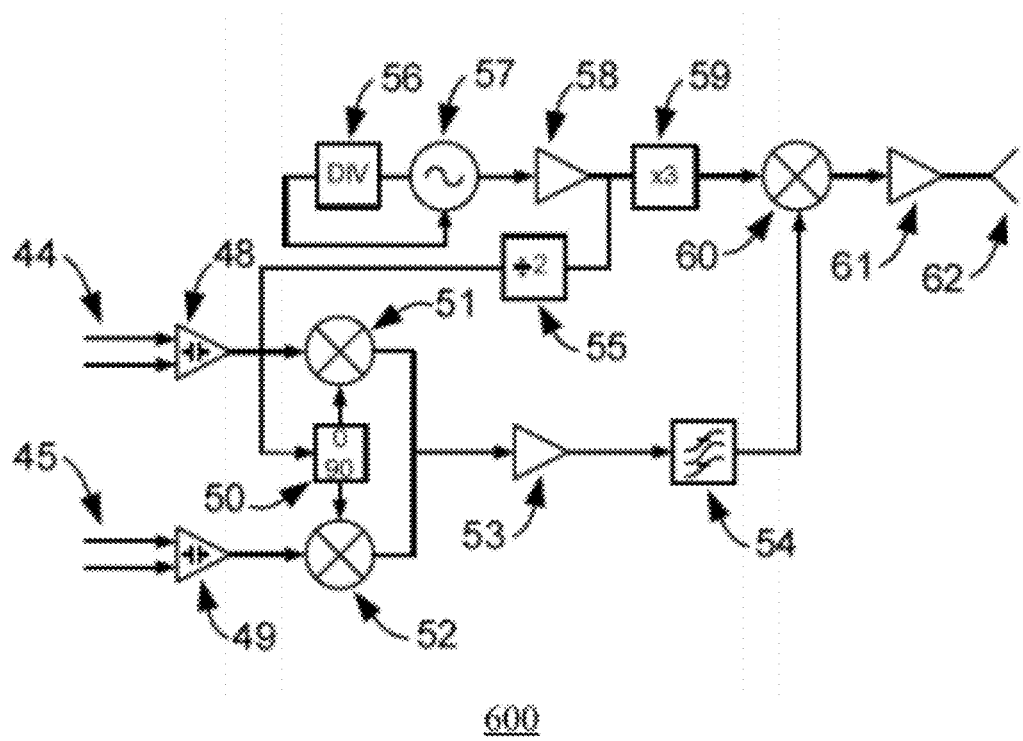
FIGS. 5A-5B illustrate an electronic block diagram, signal timing and spectrograph transmission information for a vector modulated transmitter of an aspect of the present disclosure.

FIG. 5A illustrates an overall system level block diagram, signal timing 47, 79 and transmission spectrograph 80 (FIG. 5B) of a vector-modulated transmitter and non-coherent receiver used in an embodiment. Transmitter 600 synthesizer 56, 57, 58, 59 is set to an operating frequency of 59.0 GHz in an embodiment. TDS signal 44A from I-channel baseband output 44 is coupled to transmitter I-channel input stage 48. TDS signal 45A from Q-channel baseband output 45 is coupled to transmitter Q-channel input stage 49. Transmitter I and Q channel input stages 48, 49 are AC-coupled in an embodiment. OOK modulated clock Q-channel signal 45 is phase delayed 90 degrees relative to the I-channel signal 44.

Figure 5B:
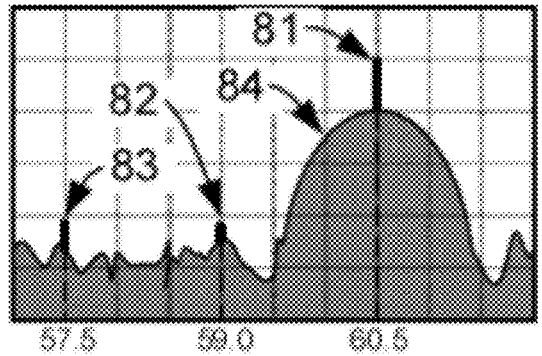
Figure 6A:
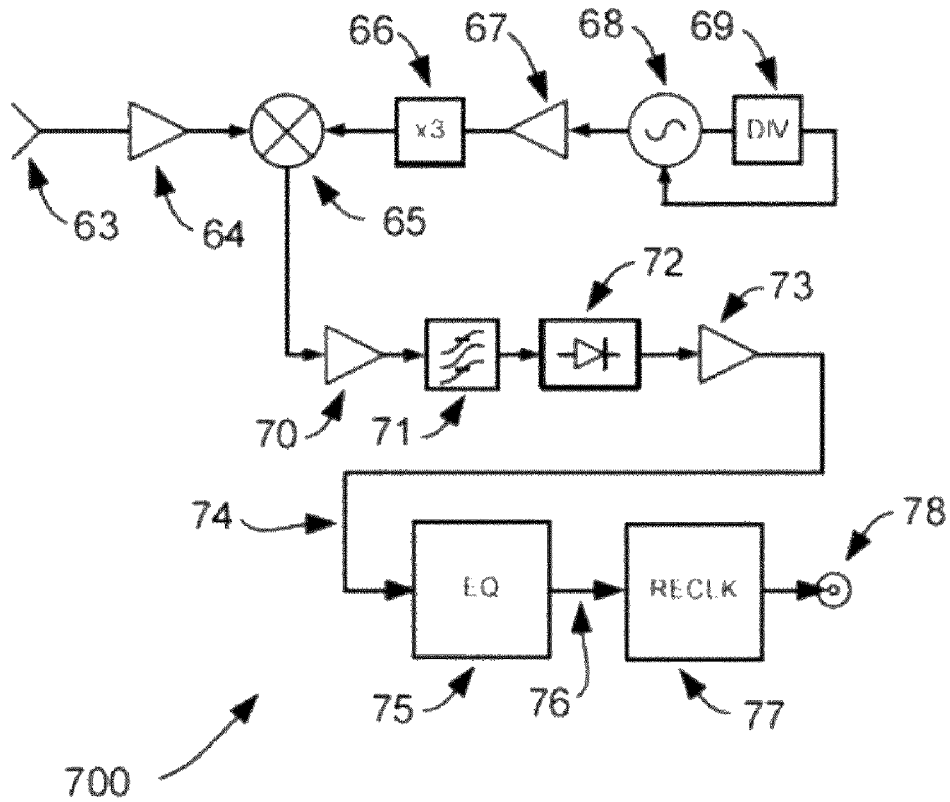
FIGS. 6A-6B illustrate an electronic block diagram, and signal timing information for a non-coherent receiver in an aspect of the present disclosure.
Figure 6B:
Figure 6B:
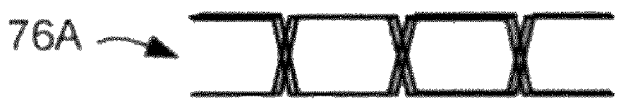
Figure 6B:

As shown in the spectrograph 80 in FIG. 5B, the upper sideband 81 is offset from the synthesizer carrier setting by clock frequency of 1.5 GHz in an embodiment. Synthesizer carrier 82 at 59.0 GHz and lower sideband 83 at 57.5 GHz are suppressed by the action balanced mixers 51, 52. OOK clock modulation 84 is formed around the upper sideband 81 at the transmitter 600 output which is coupled to antenna 62 and radiated. It is also possible to produce lower sideband output in an embodiment by reversing the quadrature phase relationship between I and Q input signals 44A, 45A to transmitter 600.

Receiver 700 preferably incorporates the same synthesizer and IF design as transmitter 600 in an embodiment. Receiver 700 synthesizer 65, 66, 67, 68, 69 is set to 60.5 GHz in an embodiment. Receiver 700 antenna 63 is illuminated by OOK modulated radiation from transmitter 600 antenna 62 at 60.5 GHz. Receiver signal is amplified by low noise amplifier (LNA) 64 and down-converted to the IF frequency and passed through IF amplifier 70 and IF filter 71. Non-coherent envelope detector 72 detects IF OOK signal and is amplified by receiver 700 baseband amplifier 73. Baseband signal 74A at baseband amplifier output 74 is coupled to EQ circuit 75. Signal 74A is degraded in amplitude and rise time due to transmission signal level impairments and system phase noise. Signal 76A at EQ circuit 75 output 76 has improved level and timing (jitter) characteristics by action of EQ circuit 75. Signal 76A is coupled to reclocker circuit 77 (RECLK) which provides further noise and signal jitter reduction. Signal 78A at reclocker circuit output 78 is available for connection to the application.

It should be noted that although hardware components are discussed above for performing actions, it is contemplated that the above actions may additionally/alternatively be performed by a software program, logic, data structure, and the like tangibly embodied to a computer readable medium which performs the novel method.

Figure 7:
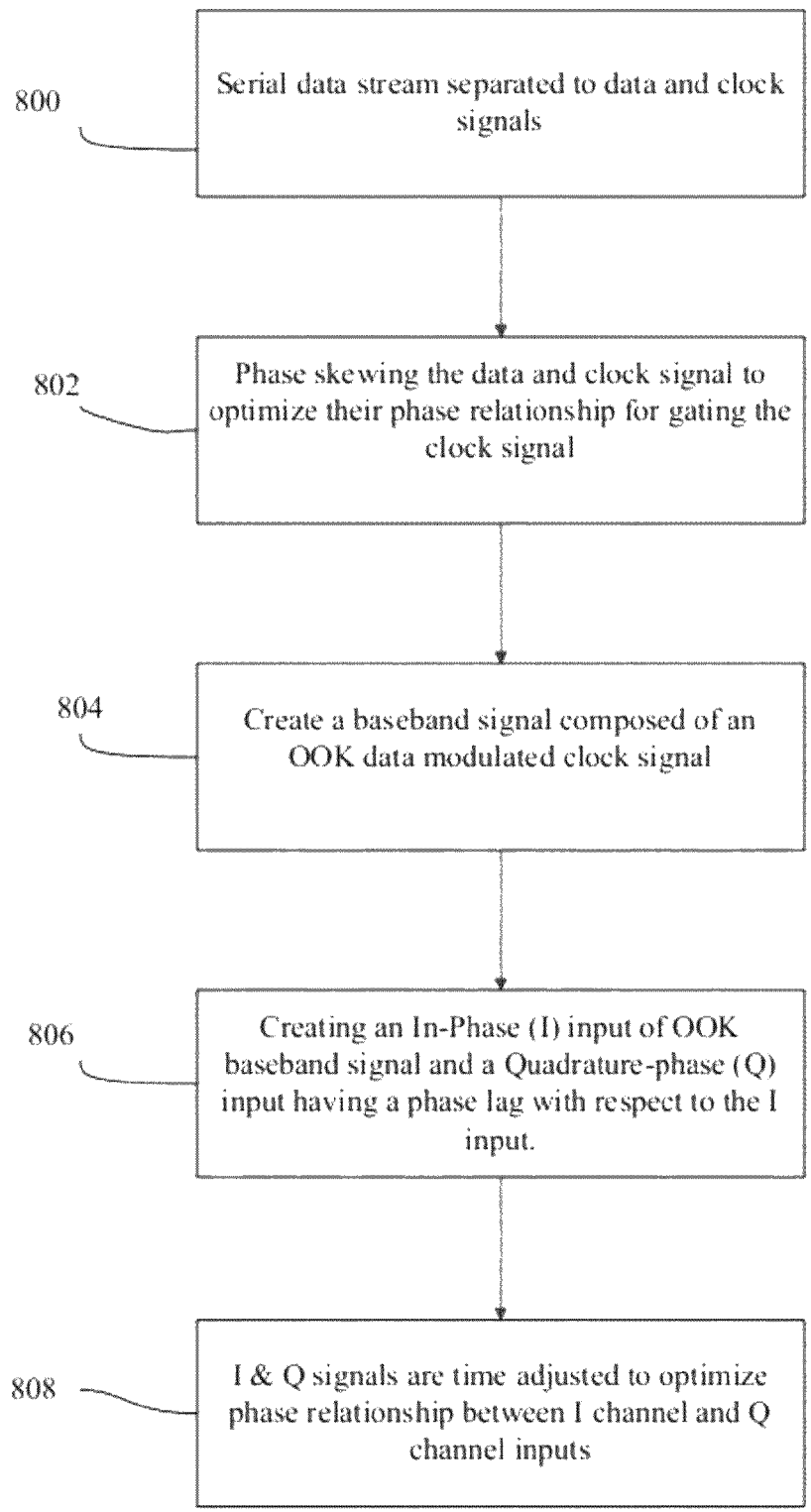
FIG. 7 illustrates a flow chart of the modulation technique employed in an aspect of the present disclosure.

A general operation at which the system, method and software performs the novel method will now be discussed in relation to FIG. 7. In an aspect, a serial data stream composed of a single high-speed digital electrical signal is separated into its constituent clock signal (timing reference) and data signal (block 800).

As shown in block 802, the data signal and clock signal are preferably time adjusted (phase skewed) such that the phase relationship between them is optimized for gating of the clock signal by the data signal.

Thereafter, a baseband signal composed of an on-off keyed (OOK) data modulated clock signal is created (block 804). This is preferably done by gating the data signal and clock signal are each using AND logic to produce a single output signal as a digital AND function.

As shown in block 806, two sets of the OOK baseband signals are created with a 90 degree phase lag between them with one set coupled to the in-phase (I) input of a vector modulated transmitter and the other (phase lagged) set coupled to the quadrature-phase (Q) input.

As shown in block 808, the I and Q signals are time adjusted (phase skewed) such that the phase relationship between them is optimized for creating the in-phase and quadrature-phase timing with respect to a vector modulated input transmitter.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method comprising:
deriving a subcarrier frequency from a binary data stream having a clock frequency, wherein the subcarrier frequency is substantially the same as the clock frequency;
gating the subcarrier frequency using the data stream to produce a modulated on-off keying signal;
delaying the modulated on-off keying signal relative to the binary data stream by a predetermined amount to produce a delayed modulated on-off keying signal; and
conditioning the modulated on-off keying signal and the delayed modulated on-off keying signal to create a differential transition signal in an in-phase channel and a quadrature-phase channel to provide a stable amplitude signal level reference at an input to an in-phase and quadrature-phase vector modulator.

2. A device comprising:
means for deriving a subcarrier frequency from a binary data stream having a clock frequency, wherein the subcarrier frequency is substantially the same as the clock frequency;
means for gating the subcarrier frequency using the data stream to produce a modulated on-off keying signal;
means for delaying the modulated on-off keying signal relative to the binary data stream by a predetermined amount to produce a delayed modulated on-off keying signal; and
means for conditioning the modulated on-off keying signal and the delayed modulated on-off keying signal to create a differential transition signal in an in-phase channel and a quadrature-phase channel to provide a stable amplitude signal level reference at an input to an in-phase and quadrature-phase vector modulator.

3. A method comprising:
separating a binary data stream into a clock signal and a data signal;
producing a plurality of clock signals and a plurality of data signals from the clock signal and the data signal;
gating the plurality of clock signals using the plurality of data signals to produce a plurality of on-off keying modulated signals;
delaying two or more of the plurality of on-off keying modulated signals to create a first set of on-off keying modulated signals and a second set of on-off keying modulated signals wherein the first set of on-off keying modulated signals has a 90 degree phase lag with respect to the second set of on-off keying modulated signals.

4. The method of claim 3 further comprising:
delaying at least of one of the data signal or the clock signal to optimize a phase relationship between the data signal and the clock signal prior to the step of gating.

5. The method of claim 3 wherein the gating step is performed using AND logic.

6. The method of claim 3 further comprising:
coupling the first set of on-off keying modulated signals to an in-phase input of a vector modulated transmitter; and
coupling the second set of on-off keying modulated signals to a quadrature-phase input of the vector modulated transmitted.

7. A device comprising:
means for separating a binary data stream into a clock signal and a data signal;
means for producing a plurality of clock signals and a plurality of data signals from the clock signal and the data signal;
means for gating the plurality of clock signals using the plurality of data signals to produce a plurality of on-off keying modulated signals; and
means for delaying two or more of the plurality of on-off keying modulated signals to create a first set of on-off keying modulated signals and a second set of on-off keying modulated signals wherein the first set of on-off keying modulated signals has a 90 degree phase lag with respect to the second set of on-off keying modulated signals.

8. The device of claim 7 further comprising:
means for delaying at least of one of the data signal or the clock signal to optimize a phase relationship between the data signal and the clock signal.

9. The device of claim 7 wherein the gating means utilizes AND logic.

10. The device of claim 7 further comprising:
means for coupling the first set of on-off keying modulated signals to an in-phase input of a vector modulated transmitter; and
means for coupling the second set of on-off keying modulated signals to a quadrature-phase input of the vector modulated transmitter.

* * * * *